United States Patent
Fahn et al.

(10) Patent No.: US 9,106,838 B2
(45) Date of Patent: Aug. 11, 2015

(54) AUTOMATIC PHOTOGRAPHING METHOD AND SYSTEM THEREOF

(71) Applicant: National Taiwan University of Science and Technology, Taipei (TW)

(72) Inventors: Chin-Shyurng Fahn, Taipei (TW); Meng-Luen Wu, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 8 days.

(21) Appl. No.: 14/228,268

(22) Filed: Mar. 28, 2014

(65) Prior Publication Data

US 2015/0189186 A1  Jul. 2, 2015

(30) Foreign Application Priority Data

Dec. 27, 2013  (TW) .............................. 102148815 A (51) Int. Cl.
| | |
|---|---|
| *H04N 5/232* | (2006.01) |
| *H04N 5/265* | (2006.01) |
| *G06K 9/46* | (2006.01) |
| *G06K 9/48* | (2006.01) |

(52) U.S. Cl.
CPC .......... *H04N 5/23293* (2013.01); *G06K 9/4671* (2013.01); *G06K 9/48* (2013.01); *H04N 5/23212* (2013.01); *H04N 5/265* (2013.01)

(58) Field of Classification Search
CPC ............ H04N 5/2356; H04N 5/23212; H04N 5/23293
USPC .......... 348/333.01, 333.11, 333.12, 239, 345, 348/349
See application file for complete search history.

(56) References Cited

U.S. PATENT DOCUMENTS

| | | | |
|---|---|---|---|
| 8,126,208 B2 * | 2/2012 | Steinberg et al. | ............. 382/103 |
| 8,736,704 B2 * | 5/2014 | Jasinski et al. | ............. 348/222.1 |
| 2009/0043422 A1 | 2/2009 | Lee et al. | |
| 2012/0268612 A1 | 10/2012 | Wang et al. | |
| 2012/0277914 A1 | 11/2012 | Crow et al. | |
| 2013/0188866 A1 | 7/2013 | Obrador et al. | |

FOREIGN PATENT DOCUMENTS

TW  I338265  3/2011

OTHER PUBLICATIONS

Fahn et al., "An Autonomous Aesthetics-driven Photographing Instructor System with Personality Prediction," Advances in Intelligent Systems Research, Feb. 2014, pp. 1-7.

* cited by examiner

*Primary Examiner* — Tuan Ho
(74) *Attorney, Agent, or Firm* — Jianq Chyun IP Office (57) ABSTRACT

An automatic photographing method, adapted to automatically photograph an image based on aesthetics, includes the following steps. First, view finding is performed on a pre-capture region so as to generate an image view. It is determined whether the image view satisfies an image composite template. When the image view satisfies the image composite template, the view image is set as a pre-capture image. When the image view does not satisfy the image composite template, a moving distance between the pre-capture region and a focus region mapping to the image composite template is calculated, and it is determined whether to set the image of the pre-capture region as the pre-capture image according to the moving distance. The pre-capture image is evaluated according to personal information of the user so as to decide whether or not to capture the pre-capture image.

10 Claims, 7 Drawing Sheets

AUTOMATIC PHOTOGRAPHING METHOD AND SYSTEM THEREOF

CROSS-REFERENCE TO RELATED APPLICATION

This application claims the priority benefit of Taiwan application serial no. 102148815, filed on Dec. 27, 2013. The entirety of the above-mentioned patent application is hereby incorporated by reference herein and made a part of this specification.

BACKGROUND OF THE INVENTION

1. Field of the Invention

The present invention generally relates to a photographing method and system, in particular, to an automatic photographing method and system thereof.

2. Description of Related Art

Along with the development of technology, a variety of smart electronic devices such as a tablet computer, a personal digital assistant (PDA), a smart phone, and so forth are becoming more indispensable for everyday tasks, where camera lenses come with some high-end smart electronic devices may perform equally well to conventional digital cameras, or even better. Few of the high-end smart electronic devices provide an image with a similar quality to that provided by a digital single lens reflex camera (DSLR). Recently, the population using such smart electronic devices with cameras all over the world, no matter in the developed countries or in the developing countries, is increasing in a long term trend.

However, such smart electronic devices used in photographing may only provide object and scene recognition as well as image enhancement but rarely provide any feature of automatic image composition and view finding. Hence, a photographer is needed in a social gathering or traveling to photograph the entire event. The pleasure of the event may be interrupted or ruined, and the photographer may not be appeared in photos. Moreover, the users of the smart electronic devices may not be professional photographers. Even if the users wish to capture precious moments with a best view finding technique at outdoors, most of the users may not additionally hire a professional photographer due to an economic issue.

Some existing related products have been trying to solve such problems. Nonetheless, such products are not only pricey but also photograph with conservative strategies, and thus a long waiting time may be required for photographing. Moreover, the algorithms used by such products are mainly based on facial recognition. Such function provided by the existing products is invalid when taking a photo without any facial feature. Hence, to provide a method for automatically photographing aesthetic images with low cost and high performance is one of the tasks to be solved.

SUMMARY OF THE INVENTION

Accordingly, the present invention is directed to an automatic photographing method and a system thereof which are adapted to automatically photograph an image based on aesthetics so as to obtain a photo meeting a user's expectation.

The present invention is directed to an automatic photographing method, adapted to automatically photograph an image based on aesthetics, includes the following steps: performing view finding on a pre-capture region so as to generate an image view; determining whether the image view satisfies an image composite template; calculating a moving distance between the pre-capture region and a focus region mapping to the image composite template and determining whether to set an image of the focus region as a pre-capture image according to the moving distance when the image view does not satisfy the image composite template; setting the image view as the pre-capture image when the image view satisfy the image composite template; and evaluating the pre-capture image according to personal information of a user so as to decide whether or not to photograph the pre-capture image.

According to an embodiment of the present invention, the step of determining whether the image view satisfies the image composite template includes: generating a salient map of the image view; binarizing the salient map so as to generate a binarized image; extracting a plurality of contours from the binarized image, where each of the contours respectively corresponds to a salient region; selecting a target salient region from the salient regions; and determining whether the target salient region with respect to the image view satisfy the image composite template.

According to an embodiment of the present invention, the step of calculating the moving distance between the pre-capture region and the focus region mapping to the image composite template and determining whether to set the image of the focused region as the pre-capture image according to the moving distance when the image view does not satisfy the image composite template includes: calculating an Euclidean distance between a centroid of the target salient region and each power point in the image composite template as well as generating a matching score according to a minimum Euclidean distance among the Euclidean distances, where the matching score is inversely proportional to the minimum Euclidean distance; calculating the moving distance according to the centroid of the target salient region, the power points in the image composite template, and an area of the target salient region; determining whether the matching score is greater than a score threshold and the moving distance is less than a distance threshold; and when the matching score is greater than the score threshold and the moving distance is less than the distance threshold, focusing the centroid of the target salient region onto the power point corresponding to the minimum Euclidean distance so as to generate the focus region and setting the focus region as the pre-capture image; otherwise, performing view finding on a new pre-capture region until obtaining the pre-capture image.

According to an embodiment of the present invention, before the step of setting the image view as the pre-capture image, the automatic photographing method further includes the following steps: feeding the image view into a decision tree and determining whether the image view is suitable according to a plurality of image features of the image view, where each of a plurality of internal nodes of the decision tree represents a decision rule of each of the image features, and where each of a plurality of leaf nodes of the decision tree indicates that the image view is suitable or unsuitable; and adjusting the image view according to the image feature corresponding to the leaf node where the image view is located when the image view is determined to be unsuitable.

According to an embodiment of the present invention, the step of evaluating the pre-capture image according to the personal information of the user so as to decide whether or not to photograph the pre-capture image includes: extracting personal information and image data of a plurality of other users; extracting a plurality of image features from the image data of each of the other users; generating a plurality sets of feature weights by performing a clustering analysis according to the personal information and the image data of the other users; obtaining a set of user feature weights from the sets of feature weights according to the personal information of the user, where the set of the user feature weights is the set of the feature weights corresponding to the user; calculating an image score of the image view according to the image features of the image view and the set of the user feature weights; comparing the image score with a score threshold; photographing the image view when the image score is greater than or equal to the score threshold; and giving up on photographing the image view when the image score is less than the score threshold.

The present invention is directed to an automatic photographing system including a servomotor and an electronic device, where the electronic device is carried by and coupled to the servomotor. The servomotor is adapted to rotate the electronic device to a plurality of orientations and a plurality of angles. The electronic device includes an image capturing unit and a processing unit, where the image capturing unit is coupled to the processing unit. The image capturing unit is configured for performing view finding on a pre-capture region so as to generate an image view. The processing unit is configured for: determining whether the image view satisfies an image composite template; calculating a moving distance between the pre-capture region and a focus region mapping to the image composite template and determining whether to set an image of the focus region as a pre-capture image according to the moving distance when the image view does not satisfy the image composite template; setting the image view as the pre-capture image when the image view satisfy the image composite template; and evaluating the pre-capture image according to personal information of a user so as to decide whether or not to photograph the pre-capture image.

According to an embodiment of the present invention, the processing unit is configured for: generating a salient map of the image view; binarizing the salient map so as to generate a binarized image; extracting a plurality of contours from the binarized image, where each of the contours respectively corresponds to a salient region; selecting a target salient region from the salient regions; and determining whether the target salient region with respect to the image view satisfy the image composite template.

According to an embodiment of the present invention, the processing unit is configured for: calculating an Euclidean distance between a centroid of the target salient region and each power point in the image composite template as well as generating a matching score according to a minimum Euclidean distance among the Euclidean distances, where the matching score is inversely proportional to the minimum Euclidean distance; calculating the moving distance according to the centroid of the target salient region, the power points in the image composite template, and an area of the target salient region; determining whether the matching score is greater than a score threshold and the moving distance is less than a distance threshold; and when the matching score is greater than the score threshold and the moving distance is less than the distance threshold, focusing the centroid of the target salient region onto the power point corresponding to the minimum Euclidean distance so as to generate the focus region and setting the focus region as the pre-capture image; otherwise, performing view finding on a new pre-capture region until obtaining the pre-capture image.

According to an embodiment of the present invention, the processing unit is further configured for: feeding the image view into a decision tree and determining whether the image view is suitable according to a plurality of image features of the image view, where each of a plurality of internal nodes of the decision tree represents a decision rule of each of the image features, and where each of a plurality of leaf nodes of the decision tree indicates that the image view is suitable or unsuitable; and adjusting the image view according to the image feature corresponding to the leaf node where the image view is located when the image view is determined to be unsuitable.

According to an embodiment of the present invention, the electronic device further comprises: a data extracting module, extracting personal information and image data of a plurality of other users as well as extracting a plurality of image features from the image data of each of the other users. The processing unit is configured for: generating a plurality sets of feature weights by performing a clustering analysis according to the personal information and the image data of the other users; obtaining a set of user feature weights from the sets of feature weights according to the personal information of the user, where the set of the user feature weights is the set of the feature weights corresponding to the user; calculating an image score of the image view according to the image features of the image view and the set of the user feature weights; comparing the image score with a score threshold; photographing the image view when the image score is greater than or equal to the score threshold; and giving up on photographing the image view when the image score is less than the score threshold.

To sum up, the automatic photographing method and the system thereof provided in the present invention perform analysis on an image view so as to determine whether the image view possesses aesthetic quality. A salient map is generated according to the image view so as to determine an eye-catching area within the image view and control the system for image composition. Furthermore, to prevent subjective aesthetic judgments, machine learning may be performed on different scenes and different diversity groups of users by leveraging a neural network model so as to obtain a plurality sets of feature weights of a plurality of image features. When personal information of the user is provided, a photo meeting the user's expectation may be obtained. Accordingly, operations such as navigation, view finding, aesthetic evaluation and automatic photographing are performed by the automatic photographing system without human involve and therefore enhance the life convenience.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed. It also should be understood, that the summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts. In addition, the specifications and the like shown in the drawing figures are intended to be illustrative, and not restrictive. Therefore, specific structural and functional detail disclosed herein are not to be interpreted as limiting, but merely as a representative basis for teaching one skilled in the art to variously employ the present invention.

Figure 1:
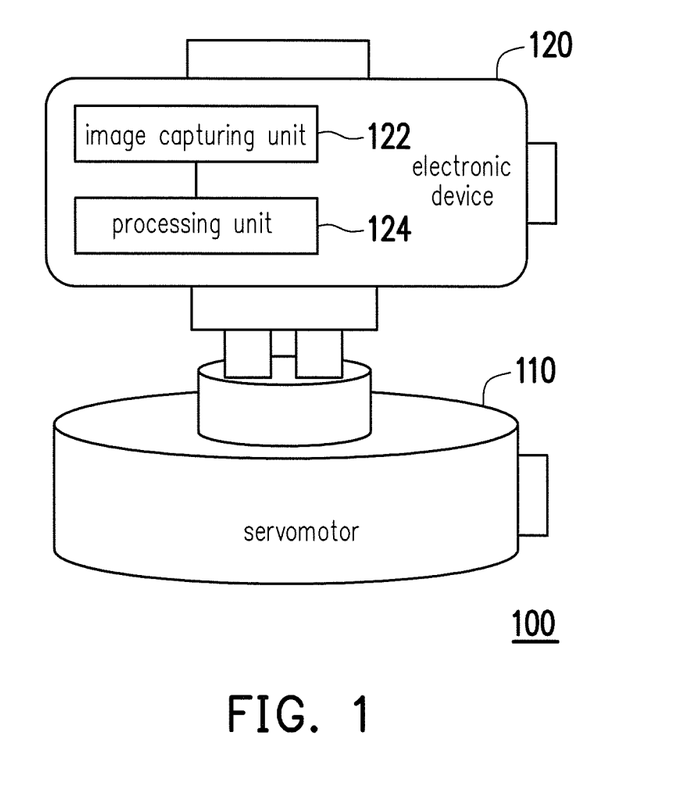
FIG. 1 illustrates a schematic diagram of an automatic photographing system according to an embodiment of the present invention.

FIG. 1 illustrates a schematic diagram of an automatic photographing system according to an embodiment of the present invention. It should, however, be noted that this is merely an illustrative example and the present invention is not limited in this regard. All components of the automatic photographing system and their configurations are first introduced in FIG. 1. The detailed functionalities of the components are disclosed along with FIG. 2.

Referring to FIG. 1, an automatic photographing system 100 includes a servomotor 110 and an electronic device 120, where the electronic device 120 includes an image capturing unit 122 and a processing unit 124. In the present embodiment, the automatic photographing system 100 may provide an automatic photographing mechanism to photograph an image based on aesthetics.

The servomotor 110 is adapted to carry the electronic device 120, which may rotate horizontally or vertically to a plurality of different orientations and angles.

The electronic device 120 may be a digital camera or any electronic device with an image capturing feature such as a smart phone, a personal digital assistant (PDA), a tabular computer, and so forth. The present invention is not limited herein. The electronic device 120 may be coupled to the servomotor 110 via a wired connection or a wireless connection and further control the rotation orientation and the rotation angle of the servomotor 110 via the processing unit 124.

The image capturing unit 112 may include a lens and a charge coupled device (CCD) image sensor adapted to continuously perform view finding and image capturing. The processing unit 124 may be one or a combination of a central processing unit (CPU), a programmable general- or specific-purpose microprocessor, a digital signal processor (DSP), a programmable controller, application specific integrated circuits (ASIC), a programmable logic device (PLD), or any other similar devices. The processing unit 124 is adapted to control the overall operation of the automatic photographing system 100.

Figure 2:
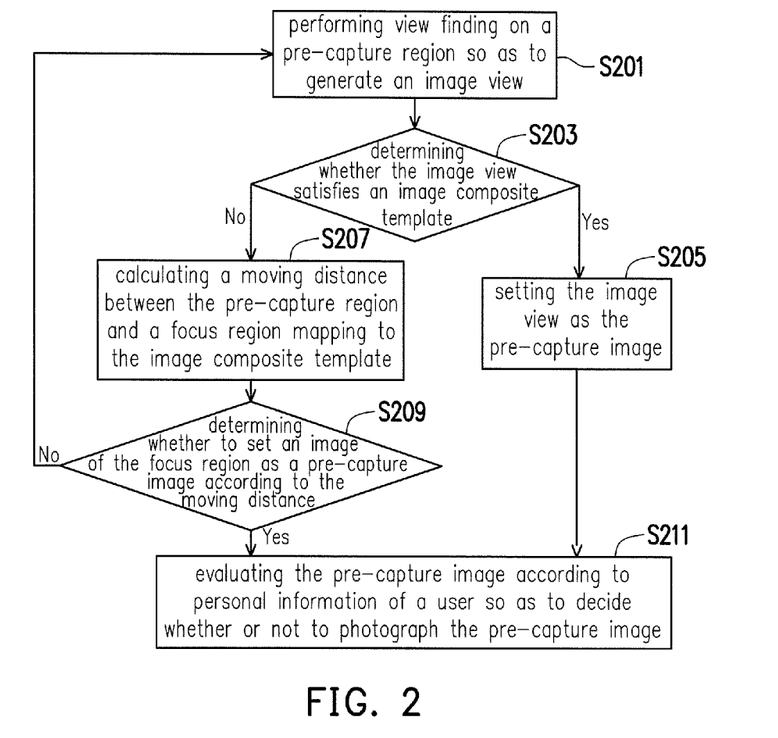
FIG. 2 illustrates a flowchart of an automatic photographing method according to an embodiment of the present invention.

FIG. 2 illustrates a flowchart of an automatic photographing method according to an embodiment of the present invention. The method illustrated in FIG. 2 may be implemented by the automatic photographing system 100 illustrated in FIG. 1.

Referring to FIG. 2, the image capturing unit 122 of the electronic device 120 performs view finding on a pre-capture region so as to generate an image view (Step S201). To be specific, the processing unit 124 of the electronic device 120 may first control the servomotor 110 to rotate to a preset or random orientation and then perform view finding on the region corresponding to such orientation. The image view may be an image with low resolution.

Next, the processing unit 124 of the electronic device 120 determines whether the image view satisfies an image composite template (Step S203). In general, the composition of an image is a significant factor for evaluating the aesthetic quality of the image. Moreover, an eye-catching region within an image is also a factor for evaluating the composition of the image. Thus, the processing unit 124 may first generate a salient map of the image view according to color features of the image view and compare the image view with image composite templates which are commonly used by processional photographers so as to determine whether the image view satisfies any of the image composite templates and further determine whether the image view possesses aesthetic quality.

To be specific, the eye-catching region in an image is referred to as a "salient region". The eye-catching region may vary in different images. On the other hand, the eye-catching region in a same image may vary from different people's perspectives. The salient map is a two-dimensional histogram generated according to the color features of the view image, which labels different eye-catching levels. In the present embodiment, the salient map is generated according to the frequency of each color of the image view. Through the accumulation of each of the frequency of the colors in the image view, a salient level of each pixel in the image view may be obtained according to Eq. (1)

$$S(I_k) = S(C_l) = \sum_{j=1}^{n} f_j D(c_l, c_j) \quad \text{Eq. (1)}$$

where $S(I_k)$ is the pixel value of a pixel $I_k$ in the salient map, $c_l$ is a color l, $f_j$ is the frequency of a color j, and D is the distance between two colors in the CIELab color space. In Eq. (1), the total number of the colors may adversely affect the computation performance, and thus color reduction may be applied according to Eq. (2):

$$C_i = \left\lfloor \frac{C_i}{C_{max}/\beta} \right\rfloor \times (C_{max}/\beta) \quad \text{Eq. (2)}$$

where $C_i$ is the color of the pixel i, $C_{max}$ is the maximum color intensity in the color space, $\beta$ is a desired color count. When the processing unit 124 obtains the salient map based on the frequencies of the colors, a plurality of salient regions are generated. The processing unit 124 may select one of the salient regions and determine if the selected salient region maps to a suitable location in the image composite template. The selected salient region may be referred to as a "target salient region" hereinafter. In the present embodiment, the target salient region selected by the processing unit 124 is the maximum salient region among the aforementioned salient regions.

Two of the main reasons that the maximum salient region is selected herein are as follows. Firstly, a main subject may be as large as possible in photography. Secondly, smaller salient regions may be noise. Once the lens of the electronic device 120 is moved, the smaller salient regions may be shadowed or covered due to parallax and thus are not suitable for view finding. The following descriptions will be focused on a method for extracting the maximum salient map. However, it should be noted that, the processing unit 124 may also select the salient region with the highest contrast or with the greatest intensity as the target salient region that meets the aesthetic quality in other embodiments. The present invention is not limited herein.

Figure 3:
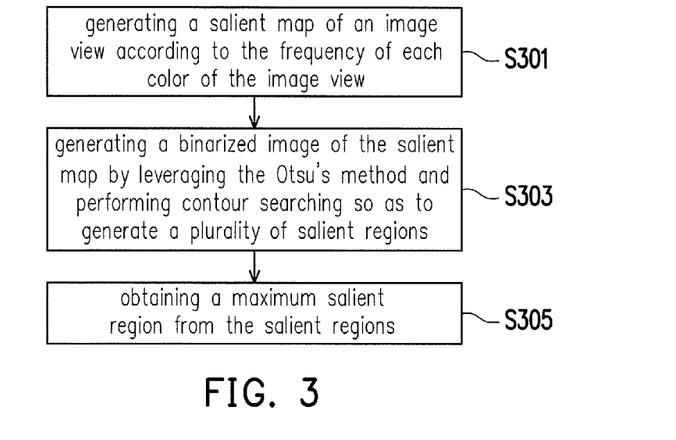
FIG. 3 illustrates a method for extracting the maximum salient region according to an embodiment of the present invention.
Figure 4:
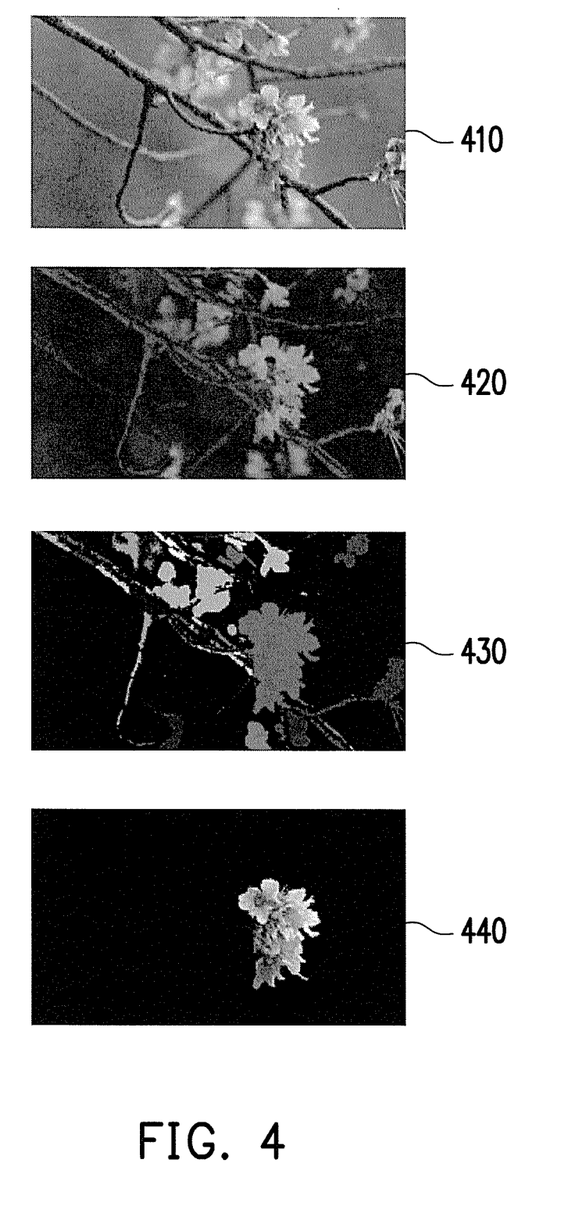
FIG. 4 illustrates images generated by the method for extracting the maximum salient region in FIG. 3.

FIG. 3 illustrates a method for extracting the maximum salient region according to an embodiment of the present invention. FIG. 4 illustrates images generated by the method for extracting the maximum salient region in FIG. 3.

Referring to both FIG. 3 and FIG. 4, the processing unit 124 generate a salient map 420 of an image view 410 according to the frequency of each color of the image view 410 (Step S301). The algorithm for generating the salient map 420 may be referred to the related description in the previous paragraphs and may not be repeated herein.

Next, the processing unit 124 generates a binarized image 430 of the salient map 420 by leveraging the Otsu's method and performs contour searching so as to generate a plurality of salient regions (Step S303). In general, the salient map is classified into a foreground and a background by adopting the graph-cut method so as to generate a binarized mask. Salient objects may be segmented out easily from the salient map with relatively less fractured area. However, the computational cost is expensive for the graph-cut method, and thus the Otsu's method is adopted to generate the binarized mask. In the binarization step of the Otsu's method, a salient object may contain non-salient fractured area. Hence, a contour searching process may be performed on the result of the binarization step of the Otsu's method. The fractured area may be eliminated thereafter and a more complete salient region may be formed.

Next, the processing unit 124 may obtain a maximum salient region 440 from the salient regions (Step S305). In other words, the processing unit 124 may obtain the maximum contour among a plurality of contours found in Step S303, where the salient region corresponding to the maximum contour is a maximum salient region 440. Accordingly, the processing unit 124 may calculate more precise parameters such as a centroid and an area of a salient object for image composition based on the aforementioned maximum salient region.

Figure 5A:
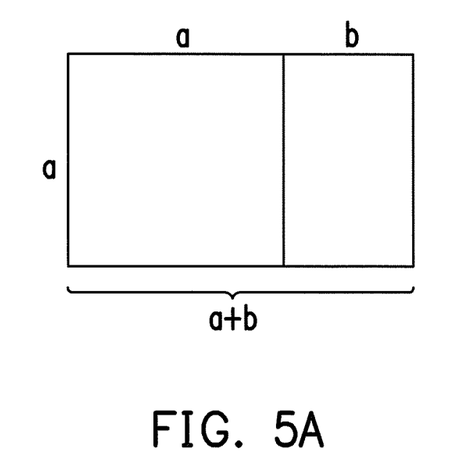
FIG. 5A illustrates a schematic diagram of the golden ratio.

In photography, if a main subject is positioned in the area of an image with respect to the golden ratio, such image may maintain high aesthetic quality. Hence, the aforementioned image composition template may be a golden ratio-based composite template such as a rule of thirds composition template, a golden ratio composition template, or a combination of a golden triangle composition template and a rule of thirds composition template. In mathematics, the golden ratio, also referred to as the golden section, describes a ratio relationship. In terms of proportion, artistry, harmony, the golden section are believed to be aesthetically pleasing and may be illustrated as FIG. 5A or written as Eq. (3):

$$\frac{a+b}{a} = \frac{a}{b} = \varphi \qquad \text{Eq. (3)}$$

In practice, the value of φ may be 0.618 or 1.618. The golden ratio is applicable in many aspects such as distance ratio calculation and area ratio calculation. A plurality of image composite templates may be thus formed through different aspects.

Figure 5B:
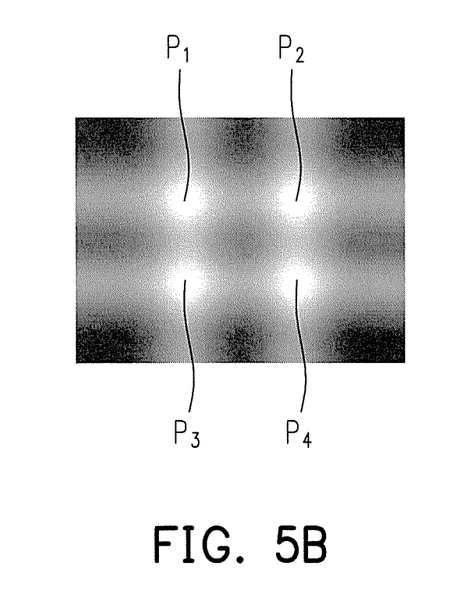
FIG. 5B illustrates a rule of thirds composite template.

For example, FIG. 5B illustrates a rule of thirds composite template. Referring to FIG. 5B, when the distance ratio is considered, the rule of thirds image composite template normally used in photography may be used. The assumption made in the rule of thirds is that the ratio of a left portion to a right portion of a main subject in the image is the golden ratio. Under such assumption, the main subject of the image is approximately located at one of four white points $P_1$-$P_4$ in FIG. 5B. The white points $P_1$-$P_4$ are referred to as power points.

Revisiting FIG. 2, in the present embodiment, the processing unit 124 of the electronic device 120 determines whether the target salient region of the aforementioned image view is located at any of the power points in Step S203. After executing Step S203, when the image view satisfies the image composite template, the processing unit 124 of the electronic device 120 may set the image view as a pre-capture image (Step S205). That is, the pre-capture image satisfies a golden ratio-based image composite template.

On the other hand, when the image view does not satisfy the image composite template, the processing unit 124 of the electronic device 120 may calculate a moving distance between the pre-capture region and a focus region mapping to the image composite template (Step S207). To be specific, when the target salient region is not located at any of the power points in the image composite template, the processing unit 124 may calculate the distance between the target salient region and each of the power points in the image composite template. In the present embodiment, the processing unit 124 may calculate an Euclidean distance between a centroid of the target salient region and each of the power points as well as find out the power point with the minimum distance to the centriod of the target salient region to calculate a matching score of the image composite template. The formulas for calculating the matching score may be presented by Eq. (6.1) and Eq. (6.2):

$$f_{template\ matching} = \min\left\{\sqrt{(C_x - P_{ix})^2 + (C_y - P_{iy})^2}\right\} \qquad \text{Eq. (1)}$$

$$S_{template\ matching} \propto \frac{1}{f_{template\ matching}} \qquad \text{Eq. (2)}$$

where $C_x$ and $C_y$ respectively represents the x-coordinate and the y-coordinate of the centroid of the target salient region; $P_{ix}$ and $P_{iy}$ respectively represents the x-coordinate and the y-coordinate of the $i^{th}$ power point; $S_{template\ matching}$ is the matching score, and a greater value of the matching score indicates a higher suitability of the image composite template.

Next, the processing unit 124 may determine whether to set an image of the focused region as the pre-capture image according to the aforementioned distance (Step S209). To be specific, the processing unit 124 may not only set the pre-capture image by calculating the matching score of the image composite template according to the power point with the minimum distance to the centriod of the target salient region, but also determine whether the distance between the pre-capture region and the focusing region mapping to the image composite template is within a certain range. The distance herein is referred to as the aforementioned "moving distance" and may be represented by Eq. (7):

$$dist = \min\left\{\sqrt{(C_x - P_{ix})^2 + (C_y - P_{iy})^2 + \frac{A_f/(w \times h) - 0.618}{\kappa}}\right\} \quad \text{Eq. (7)}$$

where $A_f$ is the area of the target salient region, w and h respectively represent the width and the height of an image, and κ is an unit distance for increasing one percent area ratio of the target salient region within the image.

Next, when the processing unit 124 determines that the matching score is greater than a score threshold and the moving distance is less than a distance threshold, the processing unit 124 may set the focus region as the pre-capture image and execute Step 211. To be specific, when the matching score is greater than the score threshold and the distance is less than the distance threshold, the processing unit 124 may control the servomotor 110 to rotate the electronic device 120 so as to focus the centroid of the target salient region onto any of the power points of the image composite template. The reason to restrict the distance within a certain range is to prevent scene changes due to parallax or other movements caused by redundant rotation of the electronic device 120 or long adjustment of the lens of the image capturing unit 122. Since the servomotor 110 may not rotate to a precise position, the setting of the distance threshold may allow an acceptable gap between the centroid of the target salient region and the power points; otherwise the rotation may never stop. On the other hand, the score threshold may be a parameter set by user preference. A larger value of the score threshold represents a more rigorous composition, and the number of images photographed by the image capturing unit 122 may be accordingly reduced. Moreover, the area of the target salient region may decide the suitability of the image. In the present embodiment, when the area of the target salient region is too small, the processing unit 124 may control the image capturing unit 122 to zoom the lens in; when the area of the target salient region is larger than that in the golden ratio, the processing unit 124 may control the image capturing unit 122 to zoom the lens out.

When the processing unit 124 determines that the matching score is not greater than the score threshold and/or the moving distance is not less than the distance threshold, then the automatic photographing method goes back to Step S201. The servomotor 110 may rotate the electronic device 110 to another random orientation or angle so that the image capturing unit 122 may perform view finding on another pre-capture region.

It should be noted that, the image composite template may not limited to be based on the golden ratio. In other embodiments, the aforementioned image composite template may be any composition commonly used in photography such as a triangle composition, a radial composition, a horizontal composition, a vertical composition, a perspective composition, a oblique composition, and so forth. For example, the processing unit 124 may generate an integral image from a plurality of images and feed the integral image into a neural network for training so as to classify the composition of each of the images. When the processing unit 124 obtains the aforementioned pre-capture region, it may determine the type of the composition of the pre-capture region. The classification result may be obtained by a machine learning algorithm such as an Adaptive Boosting Algorithm (AdaBoosting Algorithm).

In some situations, an image with aesthetic quality may be hidden in the image view, and such mage is referred to as a "sub-image". To let the sub-image to be considered, the processing unit 124 may design a search window less than the pre-capture region. The processing unit 124 may then search for the sub-image, for example, from the left to the right and from the top to the bottom of the pre-capture region and determine whether any sub-image captured by the search window satisfies the image composite template. When the processing unit 124 is not able to find any sub-image satisfy the image composite template within the image view, it may adjust the size of the search window and repeat the searching process. Accordingly, the number of times to rotate the electronic device 120 by the servomotor 110 for scene searching may be reduced and decent images may not be easily discarded as well.

In another embodiment, when the processing unit 124 determines that the image view satisfies the image composite template, before it sets the image view as the pre-capture image, it may evaluate the image view in an overall perspective to determine if the image view possesses aesthetic quality. In the present embodiment, the processing unit 124 may determine whether the image view is a suitable image by leveraging a decision tree algorithm.

Figure 6A:
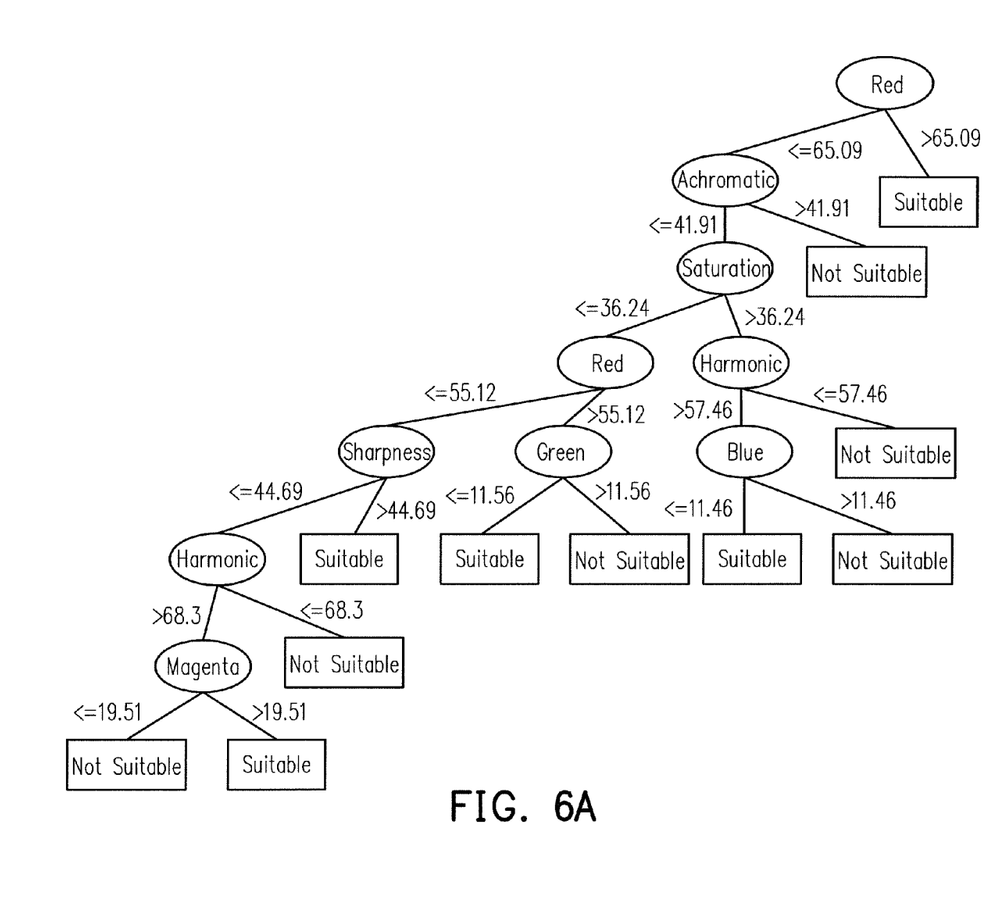
FIG. 6A-6C illustrates a decision tree according to an embodiment of the present invention.

To be specific, a decision tree may be prestored in the electronic device 120, where each of a plurality of internal nodes of the decision tree represents a decision rule of each of the image features, and each of a plurality of leaf nodes of the decision tree indicates that the image view is suitable or unsuitable. In an embodiment, the processing unit 124 may feed the image view into, for example, a decision tree as illustrated in FIG. 6A so as to evaluate the features such as achromatic, saturation, sharpness, harmony, red, green, cyan, and so forth. However, it should be noted that, in other embodiments, a decision tree with other different decision rules corresponding to another different aesthetic standard may be prestored in the electronic device 120. The present invention is not limited herein.

Figure 6B:
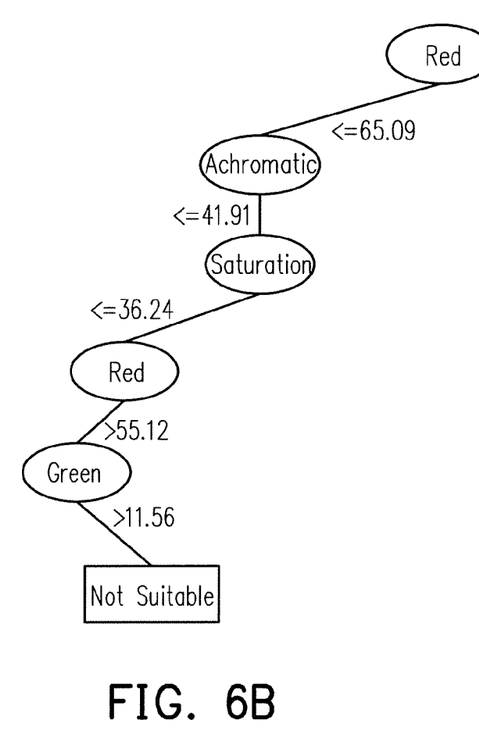
Figure 6C:
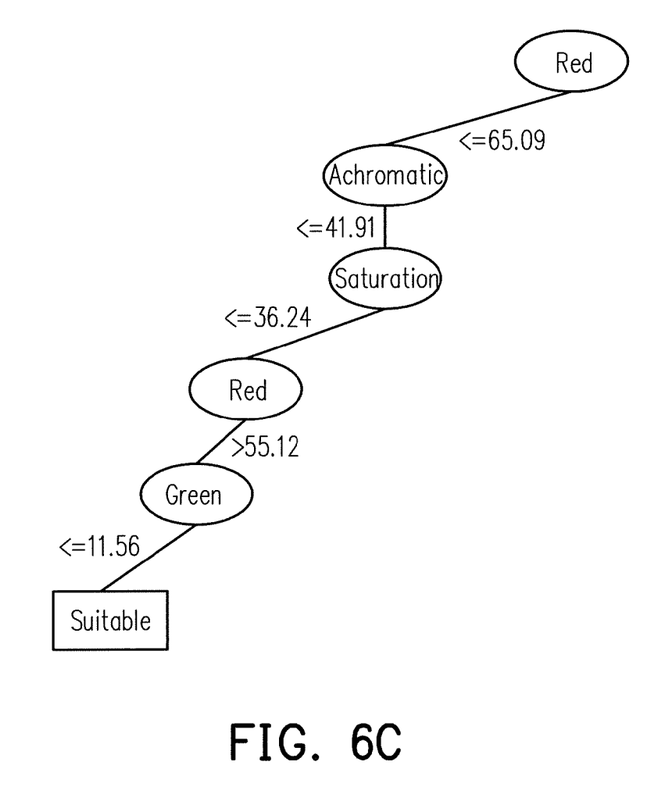

When the processing unit 124 determines that the image view is unsuitable based on the output of the decision tree, the processing unit 124 may adjust the image view according to the image feature corresponding to the leaf node where the image view is located. Take FIG. 6B as an example. When the output of the decision tree is indicates that the image view is unsuitable, the image feature corresponding to the leaf node is "green." In other words, the processing unit 124 may examine the decision tree and may figure out that the reason caused the image view to be unsuitable is the excessive green component. The processing unit 124 may notify the user to adjust the related feature. After the user adjust the image view based on the notification, the decision tree may indicate that the adjusted image view is suitable as illustrated in FIG. 6C.

The automatic photographing mechanism may be done through the aforementioned image composite template, the analysis on the salient map and the decision tree. It is also worth to mention that, the aesthetic standard may vary in different generations and diversity groups. Such subjective viewpoint may also vary from time to time and may be thus be updated. Accordingly, in the present embodiment, after the processing unit 124 sets the pre-capture image, it may evaluate the pre-capture image according to personal information of the user so as to decide whether or not to photograph the pre-capture image (Step S211).

To be specific, the processing unit 124 may extract massive amounts of personal information and image data of other users via a wired transmission or a wireless transmission by a data extracting module (not shown) and then perform machine learning on different scenes and different diversity groups of the other users by using a neural network model so as to calculate the association between a certain group of the users and their desired image features in an image. The processing unit 124 may thus obtain a plurality of different feature weights of each of the image features.

In one embodiment, the data extracting module includes a web crawler for automatically and randomly extracting the personal information and the image data of the other users from homepages of social networking sites such as Facebook, Twitter, Plurk, and so forth. The personal information may include age, gender, education, work place, and so on. The image data may include uploaded photos on the homepages of the social networking sites of the other users. Such photos may normally meet the aesthetic criteria of the other users. Since there exists an association between certain groups of users and their desired aesthetic features, the processing unit 124 may first extract image features such as brightness, hue, harmony, sharpness, facial feature, animal, sky, and floor from the photos on the homepages and then obtain the association between the photos and certain groups of the users according to the aforementioned personal information and image features. In other words, the processing unit 124 may calculate the class association between diversity groups of the users and image features. If an image feature is highly associated with a certain group of the users, a weight of such image feature may be higher for such group of the users for evaluation. The weights of all of the image features may be together defined as a set of feature weights. Accordingly, the processing unit 124 may generate a plurality sets of feature weights according to the personal information of the other users.

After the processing unit 124 obtains the pre-capture image, it may evaluate the pre-capture image based on the personal information of the user of the electronic device 120. In the present embodiment, the processing unit 124 may obtain the personal information of the user such as age, gender, education, and work place from the social networking application installed in the electronic device 120. In another embodiment, the processing unit 124 may receive the personal information manually input by the user. The present invention is not limited herein.

After the processing unit 124 obtains the personal information of the user, it may identify the belonging group of the user, assign a set of user feature weights for evaluating the pre-capture image and generate an image score, where the set of the user feature weights is the set of the feature weights corresponding to the user. When the processing unit 124 determines that the image score is greater than or equal to a score threshold, it represents that the aforementioned pre-capture image meets the user's expectation and the image capturing unit 122 may photograph the pre-capture image. Otherwise, the image capturing unit 122 may give up on photographing the pre-capture image.

It should be noted that, whether the image capturing unit 122 photographs the aforementioned pre-capture image or not, the automatic photographing system 100 may go back to Step S202 to start over the automatic photographing method.

To sum up, the automatic photographing method and the system thereof provided in the present invention perform analysis on an image view so as to determine whether the image view possesses aesthetic quality. A salient map is generated according to the image view so as to determine an eye-catching area within the image view and control the system for image composition. Furthermore, to prevent subjective aesthetic judgments, machine learning may be performed on different scenes and different diversity groups of users by leveraging a neural network model so as to obtain a plurality sets of feature weights of a plurality of image features. When personal information of the user is provided, a photo meeting the user's expectation may be obtained. Accordingly, operations such as navigation, view finding, aesthetic evaluation and automatic photographing are performed by the automatic photographing system without human involve and therefore enhance the life convenience.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. An automatic photographing method, adapted to automatically photograph an image based on aesthetics, comprising:
    performing view finding on a pre-capture region so as to generate an image view;
    determining whether the image view satisfies an image composite template;
    calculating a moving distance between the pre-capture region and a focus region mapping to the image composite template and determining whether to set an image of the focus region as a pre-capture image according to the moving distance when the image view does not satisfy the image composite template;
    setting the image view as the pre-capture image when the image view satisfy the image composite template; and
    evaluating the pre-capture image according to personal information of a user so as to decide whether or not to photograph the pre-capture image.

2. The automatic photographing method according to claim 1, wherein the step of determining whether the image view satisfies the image composite template comprises:
    generating a salient map of the image view;
    binarizing the salient map so as to generate a binarized image;
    extracting a plurality of contours from the binarized image, wherein each of the contours respectively corresponds to a salient region;
    selecting a target salient region from the salient regions; and
    determining whether the target salient region with respect to the image view satisfy the image composite template.

3. The automatic photographing method according to claim 2, wherein the step of calculating the moving distance between the pre-capture region and the focus region mapping to the image composite template and determining whether to set the image of the focused region as the pre-capture image according to the moving distance when the image view does not satisfy the image composite template comprises:

calculating an Euclidean distance between a centroid of the target salient region and each power point in the image composite template as well as generating a matching score according to a minimum Euclidean distance among the Euclidean distances, wherein the matching score is inversely proportional to the minimum Euclidean distance;

calculating the moving distance according to the centroid of the target salient region, the power points in the image composite template, and an area of the target salient region;

determining whether the matching score is greater than a score threshold and the moving distance is less than a distance threshold; and when the matching score is greater than the score threshold and the moving distance is less than the distance threshold, focusing the centroid of the target salient region onto the power point corresponding to the minimum Euclidean distance so as to generate the focus region and setting the focus region as the pre-capture image; otherwise, performing view finding on a new pre-capture region until obtaining the pre-capture image.

4. The automatic photographing method according to claim 1, wherein before the step of setting the image view as the pre-capture image, the automatic photographing method further comprises:

feeding the image view into a decision tree and determining whether the image view is suitable according to a plurality of image features of the image view, wherein each of a plurality of internal nodes of the decision tree represents a decision rule of each of the image features, and wherein each of a plurality of leaf nodes of the decision tree indicates that the image view is suitable or unsuitable; and adjusting the image view according to the image feature corresponding to the leaf node where the image view is located when the image view is determined to be unsuitable.

5. The automatic photographing method according to claim 1, wherein the step of evaluating the pre-capture image according to the personal information of the user so as to decide whether or not to photograph the pre-capture image comprises:

extracting personal information and image data of a plurality of other users;

extracting a plurality of image features from the image data of each of the other users;

generating a plurality sets of feature weights by performing a clustering analysis according to the personal information and the image data of the other users;

obtaining a set of user feature weights from the sets of feature weights according to the personal information of the user, wherein the set of the user feature weights is the set of the feature weights corresponding to the user;

calculating an image score of the image view according to the image features of the image view and the set of the user feature weights;

comparing the image score with a score threshold;

photographing the image view when the image score is greater than or equal to the score threshold; and giving up on photographing the image view when the image score is less than the score threshold.

6. An automatic photographing system comprising:

a servomotor, carrying an electronic device so as to allow the electronic device to rotate to a plurality of orientations and a plurality of angles;

the electronic device, carried by and coupled to the servomotor, comprising:

an image capturing unit, performing view finding on a pre-capture region so as to generate an image view;

a processing unit, coupled to the image capturing unit, wherein the processing unit is configured for:

determining whether the image view satisfies an image composite template;

calculating a moving distance between the pre-capture region and a focus region mapping to the image composite template and determining whether to set an image of the focus region as a pre-capture image according to the moving distance when the image view does not satisfy the image composite template;

setting the image view as the pre-capture image when the image view satisfy the image composite template; and evaluating the pre-capture image according to personal information of a user so as to decide whether or not to photograph the pre-capture image.

7. The automatic photographing system according to claim 6, wherein the processing unit is configured for:

generating a salient map of the image view;

binarizing the salient map so as to generate a binarized image;

extracting a plurality of contours from the binarized image, wherein each of the contours respectively corresponds to a salient region;

selecting a target salient region from the salient regions; and determining whether the target salient region with respect to the image view satisfy the image composite template.

8. The automatic photographing system according to claim 7, wherein the processing unit is configured for:

calculating an Euclidean distance between a centroid of the target salient region and each power point in the image composite template as well as generating a matching score according to a minimum Euclidean distance among the Euclidean distances, wherein the matching score is inversely proportional to the minimum Euclidean distance;

calculating the moving distance according to the centroid of the target salient region, the power points in the image composite template, and an area of the target salient region;

determining whether the matching score is greater than a score threshold and the moving distance is less than a distance threshold; and when the matching score is greater than the score threshold and the moving distance is less than the distance threshold, focusing the centroid of the target salient region onto the power point corresponding to the minimum Euclidean distance so as to generate the focus region and setting the focus region as the pre-capture image; otherwise, performing view finding on a new pre-capture region until obtaining the pre-capture image.

9. The automatic photographing system according to claim 6, wherein the processing unit is further configured for:

feeding the image view into a decision tree and determining whether the image view is suitable according to a plurality of image features of the image view, wherein each of a plurality of internal nodes of the decision tree represents a decision rule of each of the image features, and wherein each of a plurality of leaf nodes of the decision tree indicates that the image view is suitable or unsuitable; and adjusting the image view according to the image feature corresponding to the leaf node where the image view is located when the image view is determined to be unsuitable.

10. The automatic photographing system according to claim 6, wherein the electronic device further comprises:

a data extracting module, extracting personal information and image data of a plurality of other users as well as extracting a plurality of image features from the image data of each of the other users; wherein the processing unit is configured for:

generating a plurality sets of feature weights by performing a clustering analysis according to the personal information and the image data of the other users;

obtaining a set of user feature weights from the sets of feature weights according to the personal information of the user, wherein the set of the user feature weights is the set of the feature weights corresponding to the user;

calculating an image score of the image view according to the image features of the image view and the set of the user feature weights;

comparing the image score with a score threshold;

photographing the image view when the image score is greater than or equal to the score threshold; and giving up on photographing the image view when the image score is less than the score threshold.

* * * * *